Patented Jan. 9, 1923.

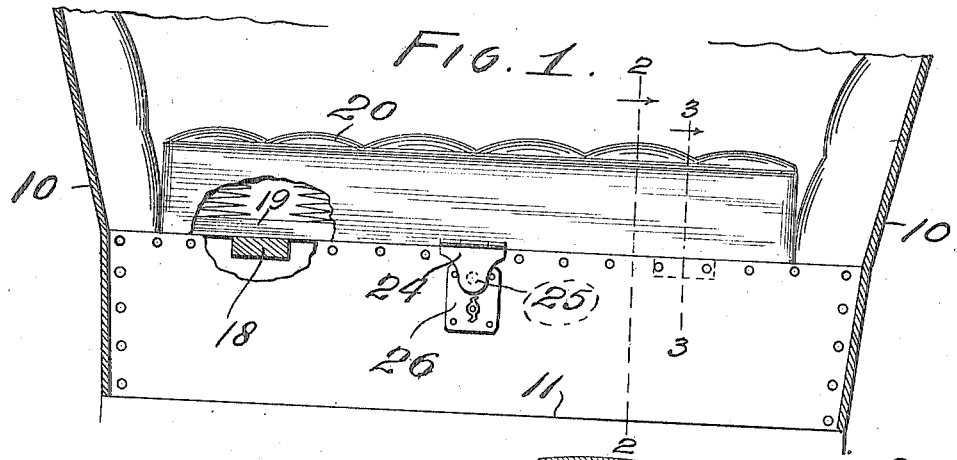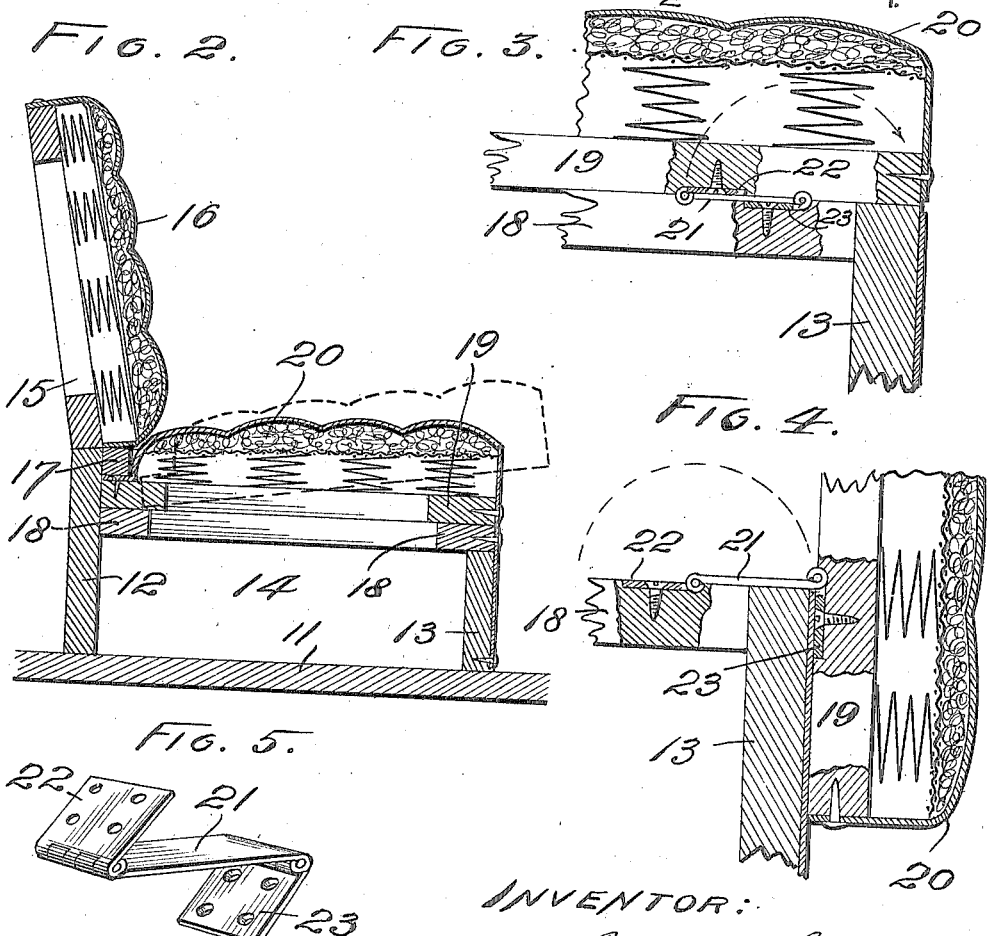

1,441,815

UNITED STATES PATENT OFFICE.

FRANK E. LINDSEY, OF ST. LOUIS, MISSOURI.

VEHICLE SEAT.

Application filed July 28, 1919. Serial No. 313,897.

*To all whom it may concern:*

Be it known that I, FRANK E. LINDSEY, a citizen of the United States, residing at St. Louis, Missouri, have invented a certain new and useful Improvement in Vehicle Seats, of which the following is a full, clear, and exact description, such as will enable others skilled in the art to which it pertains to make and use the same, reference being had to the accompanying drawings, forming part of this specification.

My invention relates generally to vehicles, and more particularly to the seats thereof, the principal objects of my invention being to provide a relatively simple cushioned seat which will serve as a cover for a space or compartment utilized for holding tools, or the like, to connect the seat to the vehicle body structure so that it may be readily opened and swung into an out-of-the-way position to give ready access to the space or compartment, and further to provide relatively simple and efficient means for retaining the seat in its closed position.

With the foregoing and other objects in view, my invention consists in certain novel features of construction and arrangement of parts hereinafter more fully described, claimed and illustrated in the accompanying drawing in which—

Fig. 1 is a cross section through the central portion of a vehicle body and showing a seat of my improved construction positioned therein.

Fig. 2 is a vertical section taken on the line 2—2 of Fig. 1.

Fig. 3 is an enlarged detailed section taken approximately on the line 3—3 of Fig. 1.

Fig. 4 is a section similar to Fig. 3 and showing the seat shifted into open position.

Fig. 5 is a perspective view of one of the hinges utilized for mounting the seat on the vehicle body.

It will be understood that my invention is particularly adapted for automobiles, and referring by numerals to the accompanying drawings, 10, 10 designate the side walls of the vehicle body, 11 the flooring thereof, and 12 and 13 a pair of transversely disposed walls arranged on the flooring and spaced apart to form a compartment 14 that is adapted to receive tools or the like. These walls extend from one side wall 10 to the other and the rear one of said walls 12 is slightly higher than the front wall 13. Supported in any suitable manner above the rear wall 12 is a seat back frame 15 on the front of which is arranged a cushion 16 of any desired construction. Arranged on the front face of the rear wall 12 and immediately beneath the cushion 16 thereof is a horizontally disposed rail 17, and secured to said wall 12, a short distance below this rail, is the rear portion of a seat supporting frame 18, the front portion of which rests on top of the front wall 13.

The seat contemplated by my invention comprises a substantial rectangular frame 19 of such size as to fit readily upon frame 18, and supported by said frame 19 is a cushion 20 of any desired construction. This cushion terminates a short distance in front of the rear edge of frame 19 so that said rear edge occupies a position beneath rail 17 when the seat is in position for use.

The seat thus constructed is connected to the seat-supporting frame 18 by double hinges of the type illustrated in Fig. 5; said hinges being disposed near the ends of the seat and adjacent to the front portion of frame 18. Each hinge comprises a center plate 21 to the ends of which are hinged in any suitable manner plates 22 and 23, the latter being perforated in order to receive attaching devices such as screws. The plates 22 of the pair of hinges utilized between the seat and the supporting frame 18 are secured directly to parts of the seat frame 19, and the plates 23 are secured directly to parts of the seat-supporting frame 18. (See Figs. 3 and 4.)

Hinged to the front lower edge of the seat frame 19 is a plate 24 provided with a suitable stud 25, which latter is adapted to enter a lock housing 26 that is secured to the central portion of front wall 13. This lock housing contains a key operating locking mechanism that is adapted to engage the stud 25 in order to lock the seat in its normal, closed position. The hinged plate 24 when unlocked serves as a tab or handle which may be engaged when the seat is swung from closed to open position, or vice-versa.

Under normal conditions, my improved seat when in position for use closes the space 14 and the rear edge of the seat frame 19 occupies a position beneath rail 17. (See Fig. 2.) To gain access to the space or compartment 14, plate 24, after being unlocked, is engaged and the front portion of the seat is simultaneously lifted and pulled forwardly; such action being possible by the provision of the double hinges between the seat and the seat-supporting frame 18. When the seat has been drawn into the position shown by dotted lines in Fig. 2, the rear edge of the frame 19 is clear or free from the retaining strip 17, and the rear portion of the seat is now engaged and swung upwardly and forwardly until said seat occupies a vertical position immediately in front of and above front wall 13. (See Fig. 4.)

Obviously, a reversal of the operations just described, will reposition the seat upon the frame 18, thus closing the space or compartment 14.

A seat of my improved construction may be readily shifted from one position to another, does not mar the finish of the adjacent parts of the vehicle while being so shifted, forms a complete closure for the space generally utilized for carrying tools, and the like, and as said seat may be locked in closed position the theft or removal of tools by unauthorized persons is prevented.

My improved seat is comparatively simple in construction and operation, can be cheaply manufactured, and while particularly adapted for automobiles, can be advantageously utilized upon all types of vehicles, including motor boats, and the like.

It will be readily understood that various changes in the size, form and construction of the parts of my improved seat may be made and substituted for those herein shown and described without departing from the spirit of my invention, the scope of which is set forth in the appended claim.

I claim—

The combination with a rigidly fixed vehicle seat supporting structure, in which is formed a compartment, of a seat frame, double jointed hinges connecting the forward portion of said seat frame to the forward portion of said supporting structure, whereby the seat frame may be pulled forward from its normal position on the supporting frame and swung into a substantially vertical position in front of the supporting frame so as to open the compartment in said supporting structure, a rail secured to the rear portion of the supporting structure, beneath which rail the rear edge of the seat frame is adapted to engage when in normal position and a cushion on said seat frame, the rear edge of which cushion is inset from the rear edge of the seat frame in order to permit the rear edge of the latter to be positioned beneath said rail.

In testimony whereof I hereunto affix my signature this 21st day of July, 1919.

FRANK E. LINDSEY.